Feb. 11, 1969   L. PREISMAN   3,426,968
PYROMETER AND CONTROL OF MANUFACTURING PROCESSES THEREWITH
Filed Nov. 29, 1966   Sheet 1 of 5

INVENTOR
LOUIS PREISMAN
BY Chisholm and Spencer
ATTORNEYS

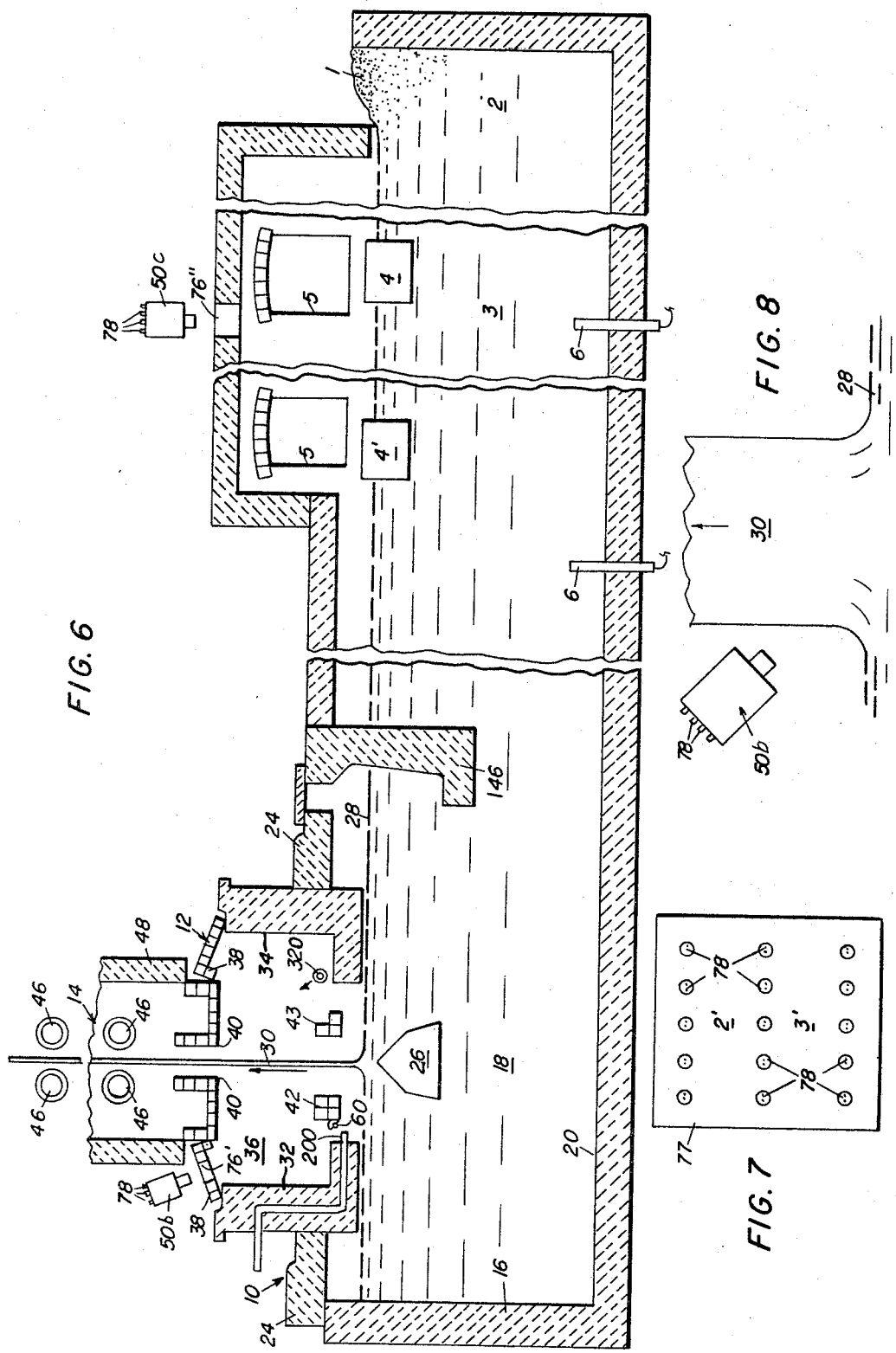

United States Patent Office 3,426,968
Patented Feb. 11, 1969

3,426,968
PYROMETER AND CONTROL OF MANUFACTURING PROCESSES THEREWITH
Louis Preisman, Wheeling, W. Va., assignor to PPG Industries, Inc., a corporation of Delaware
Filed Nov. 29, 1966, Ser. No. 597,648
U.S. Cl. 236—15     10 Claims
Int. Cl. F23n 5/08; F27d 19/00; G01j 5/08

ABSTRACT OF THE DISCLOSURE

This invention relates to a pyrometer, preferably an optical pyrometer, useful for simultaneously measuring different temperatures of a hot body at different locations on said body and at varying distances from the pyrometer. The pyrometer comprises means for focusing an image of said body upon an image-receiving area, and means in said area for simultaneously measuring the amount of light at a plurality of locations. The pyrometer is of particular utility in the control of manufacturing processes which require a hot body having controllable but differing temperatures in different parts thereof. Examples of such processes are glass manufacturing and the calcining, roasting or reduction of inorganic materials such as metalliferous ores, an example being production of black ash (BaS) from barite ($BaSO_4$).

---

The temperatures of bodies such as molten glass and particulate masses being passed through a rotary kiln, for example, are commonly performed by manually aiming a pyrometer which gives only the temperature of a spot on the body, or an average temperature of the surface of the body, or a small area thereof. Other known pyrometers include a type wherein an image is projected on a luminescent screen, and the temperature of a spot on a hot body determined by comparison of an exposed area of the screen with an unexposed area thereof. Aside from the frailties of the human eye and errors in aiming the pyrometer caused by heat waves, there has been a need for simultaneously determining the temperatures of different parts of such a hot body, and of parts of the body at varying distances from the pyrometer.

It is an object of the present invention to provide a pyrometer to satisfy said need. Another object of the invention is to provide a combination of such a pyrometer with apparatus for controlling the temperature of various parts of such a hot body. Yet another object of the invention is to provide methods of utilizing the pyrometer of the invention in the control of manufacturing operations. Other objects of the invention will be apparent from the following.

In the drawings, which are not to scale,

FIG. 6 shows a vertical section of a glass melting and refining furnace, and drawing apparatus for forming sheets of glass, with various heat transfer means, i.e., heating and cooling means for controlling the transfer of heat between the hot body and its environment, subject to control by use of the pyrometer of the invention.

FIG. 7 represents the image, with light measuring cells superimposed thereupon, of the surface of the molten glass in FIG. 6, as viewed from the position of pyrometer 50c, for measuring temperatures in the melting and fining zones.

FIG. 8 is similar to a portion of the glass drawing section of FIG. 6, with the pyrometer viewing at a different angle to the glass sheet.

Figure 1:
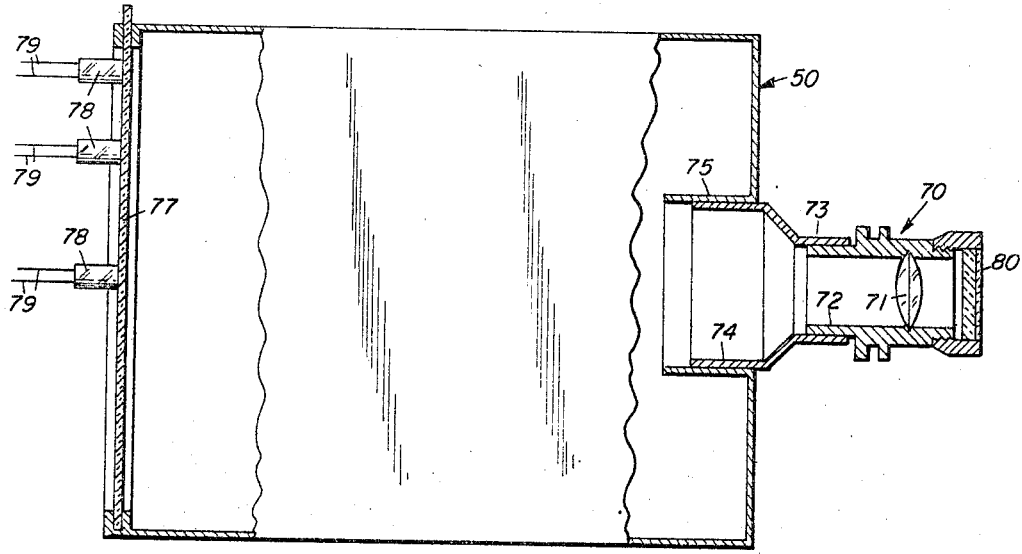
FIG. 1 illustrates an embodiment of the pyrometer of the invention.

Referring to the details of FIG. 1, the pyrometer 50 comprises a conventional camera box, preferably having a dull black interior finish. At the end of the pyrometer to be directed toward the hot body, the pyrometer contains a lens assembly 70, with a lens 71, for example a telephoto lens having a focal length of 20 inches. It will be understood that in some circumstances, as where the hot body has a large surface relative to the distance from the pyrometer, a wide angle lens would be useful. A light filter 80 may be used if desired to screen out light to which the light measuring elements 78 are not sensitive, or to alter the slope of the curve shown in FIG. 11 to adapt the device for measurement of higher or lower temperatures, as is known in the art. For focusing the image of the hot body on the image receiving area 91, an adapter having a smaller cylindrical portion 73 slidably receives a cylindrical portion 72 of the lens assembly, and having a larger cylindrical portion 74 which is received by sleeve 75 mounted in the camera box. Means, not shown, are of course utilized for retaining the focus. At the rear of the pyrometer is an image receiving area, a ground glass plate 77 in this instance. A plurality of photocells 78 having lead wires 79, such as RCA No. 4413 photosensitive cadmium sulfide light cells are secured by suitable means generally in a plane in the image receiving area.

Figure 2:
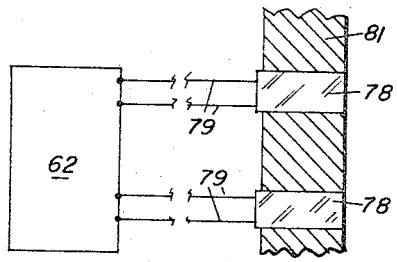
FIG. 2 illustrates a modification of the image receiving area of the pyrometer of FIG. 1.

FIG. 2 shows a modification of the image receiving area of the pyrometer of FIG. 1, wherein the photocells 78 are secured in the openings of a solid plate 81 mounted in the image receiving area. The leads 79 from the photocells 78 are operatively connected through energy converting means, such as a transducer, for converting changes in electrical energy into changes in air pressure, to one or more control means or indicating means 62 for controlling or indicating a process variable. The details of a thermal treatment, such as temperature or rate of movement, of a hot body undergoing thermal treatment, may thus be controlled. Of course, the process variable may be altered through manual controls by an operator observing the differences in temperature of various parts of the hot body at a given instant, as shown on electrical meters having temperature scales or recording meters, both well known to the art.

Figure 3:
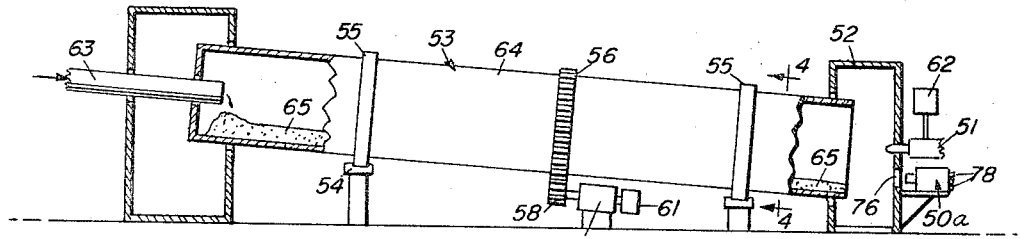
FIG. 3 illustrates its use in combination with a rotary kiln. The detailed description of this figure describes a method of using the pyrometer.

The rotary kiln 53 of FIG. 3 is of a conventional type. It comprises a stationary hood 52 at the outlet end thereof, a rotatable shell 64 inclined to the horizontal, and tracks 55 supported by and rotatable upon bearing means associated with supports 54. A worm conveyor or similar feeding means introduces the particulate material 65, which upon being conveyed through the tube and subjected to the heat from the flame of gas burner 51 and the heat from the shell 64, becomes the hot body of which the temperatures are measured. The pyrometer of the invention 50a is mounted near a viewing part 76 in the hood, suitably containing a heat-resistant glass. The pyrometer is kept cool by means of shields, reflectors, streams of cool air and the like. The temperatures of various parts of the bed are shown on a meter or recording meters, and an operator may accordingly adjust the speed of motor 59, which rotates the shell of the kiln through gears 56, 58 associated therewith. Aternatively, the flame from burner 51 may be adjusted. Under some conditions both the flame and the speed of rotation of the shell are utilized to control the temperature of the hot body or bed of material. Suitable conventional automatic control means 62 for controlling the flame and/or automatic control means 61 for the motor may be operatively connected by conventional means to the pyrometer 50a.

Figure 4:
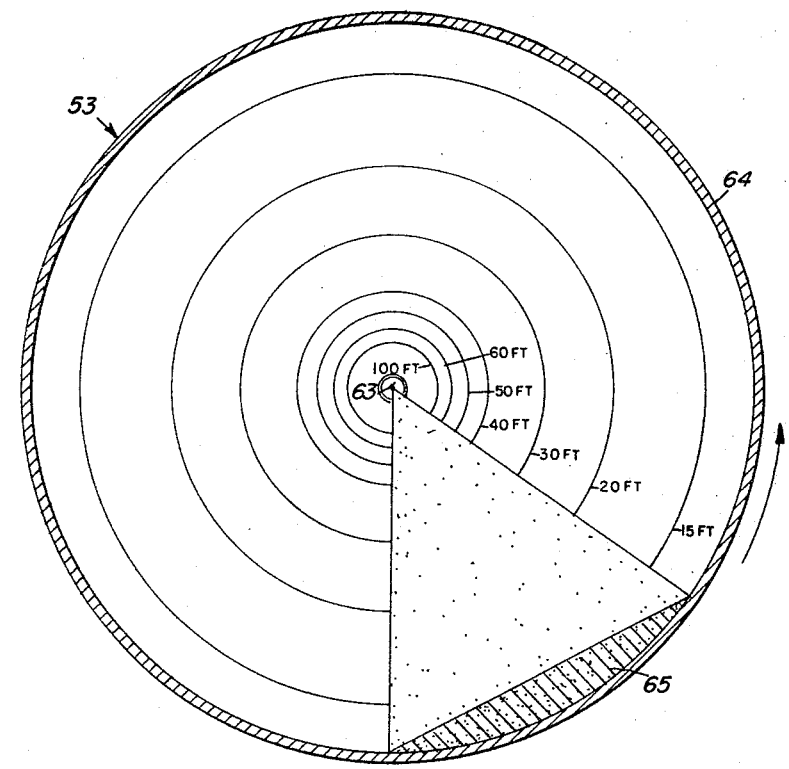
FIG. 4 is a representation of the interior of the kiln shown in FIG. 2, and the contents thereof, and is a vertical cross section on the line 4—4 of FIG. 3, partially in perspective.
Figure 5:
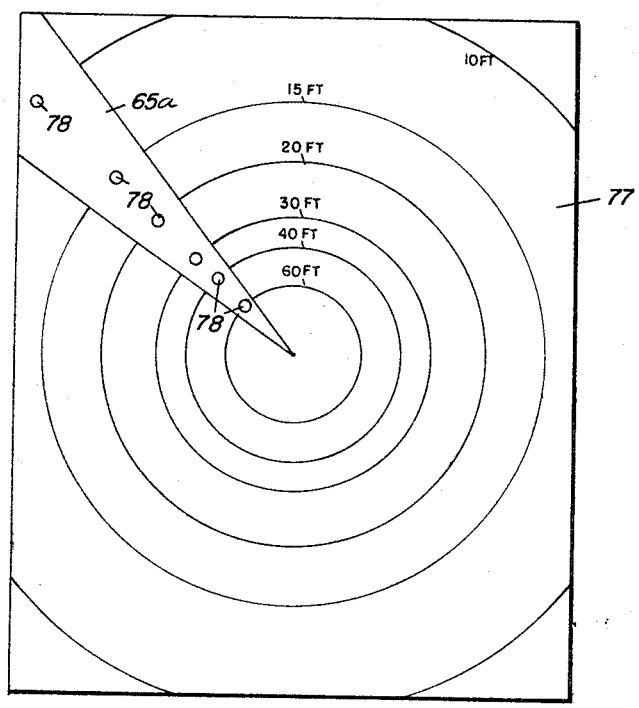
FIG. 5 represents the image obtained in the image area of the pyrometer when used with the kiln of FIG. 3 and viewing the hot body as shown in FIG. 4, with light-detecting cells superimposed thereupon.

The sectional interior view of FIG. 3 graphically shown in FIG. 4 illustrates the hot body or bed 65 of particulate material such as barites undergoing reduction to black ash. The tumbling bed is inclined because of rotation of the shell 64. The image 65a in FIG. 5 of bed 65 is similar to that which would be obtained in the image receiving area of pyrometer 50a (FIG. 3). The view in FIG. 5 would be that obtained viewing from the back of the pyrometer of FIG. 1 or FIG. 5, that is with the viewer looking toward the pyrometer from the left hand side of FIG. 1. The photocells 78 in FIG. 5 are shown in the image-receiving area of the hot body.

The rotary kiln was 78 inches, inside diameter. In order to locate the points on the image area corresponding to the points on the hot body, it is possible to calculate the same. A sample calculation at 34 feet from the camera (30 feet from the discharge end of the kiln shell) is as follows:

$$\frac{1}{\text{Object distance}} + \frac{1}{\text{Image distance}} = \frac{1}{\text{Focal length of lens}}$$

$$\frac{1}{20} = \frac{1}{\text{Image } D} + \frac{1}{34 \times 12}$$

$$\frac{1}{ID} = \frac{1}{21.2}$$

Image distance = 21.1″

Image diameter = $\frac{21.1''}{34' \times 12''} \times 78'' = 4.02''$

Distance from center of kiln image = 2.01″

Using this calculation the following image distances were obtained for the rotary kiln.

TABLE I

| Distance from kiln edge in feet | Distance in inches, center of kiln image to image circle (radium of image circle) |
| --- | --- |
| 0 | 27.8 |
| 5 | 8.9 |
| 10 | 5.3 |
| 15 | 3.75 |
| 20 | 2.9 |
| 30 | 2.0 |
| 40 | 1.55 |
| 60 | 1.05 |

FIGURE 5 represents a one half scale drawing of the image and location of the light cells.

In FIG. 6, apparatus for melting, fining, and drawing a glass sheet is shown. A number of factors involving the heat relationship and variations in temperature of the molten glass and drawn sheet are of interest in applications of the present invention to the apparatus and process shown in this figure. The flow of the molten glass from the melting zone 2 and fining zone 3 toward the working or drawing zone, convection currents due to hotter and cooler parts of the pool of molten glass, a return flow of cooler molten glass along the bottom of the tank, and springs or streams of molten glass rising to the surface are all factors which to some extent may be controlled not only by the structure of the tank, but by the temperature relationships within the hot body or pool of molten glass. In the drawing area, the temperature and consequent viscosity of the glass melt of the surface of the pool, at the point where the ribbon is drawn from the pool, and of the surfaces of the still viscous ribbon as it is drawn upwardly in the drawing chamber are suitably controlled by the pyrometer of the invention. Heat transfer between the glass and the environment is achieved by heaters and coolers, and by the controlled flow of air, usually involving baffled convection currents of cooled and/or heated air. As is shown in the patent to Cecil R. Ward and Frank J. Ran, No. 3,223,502, the heat transfer may be selective as to one side or portion of the ribbon of drawn glass or as to the front or back of the drawing chamber. The disclosure of the Ward et al patent is incorporated herein by reference as showing suitable modes of accomplishing the heat transfer between the hot glass body or bodies and the environment thereof.

In FIG. 6, aside from the improvements of the patent noted above, a more or less conventional apparatus for practicing the Pennvernon process is shown. At the left hand portion of this figure, there is illustrated a drawing bay 10, a drawing chamber 12 and a drawing machine 14. The drawing bay 10 is defined by a front wall 16, side walls 18, a floor 20, a shutoff 146 and curtain blocks 24 which act as a ceiling. All of these parts are made of a suitable, hard refractory material that will adequately withstands temperatures of the order of 2100° F. to 2200° F. Glass flows into this bay under the shutoff 146 from the main body of the glass making furnace. This glass is drawn up at the gather into the ribbon 30 along an area generally above the central rib of a draw bar 26 of refractory material which is submerged within the body or bath of glass 28 within the drawing bay. The draw bar 26 acts as a stabilizer for the ribbon of glass 30 being drawn upwardly from the bath 28. Near the end wall 16 and the shutoff 146, there are hot spring zones at which part of the glass flowing from the main body of glass separates and flows generally downwardly and returns as to the main body of glass in the furnace.

The ribbon of glass 30 is drawn through the drawing chamber 12 by the drawing machine 14. The drawing chamber 12 is defined by L-blocks 32, 34, side walls 36, door coolers 38, catch-pan coolers 40 and the surface of the bath itself. The catch-pan coolers 40 are spaced for the passage of the ribbon 30 therebetween and divide the drawing chamber 12 from the drawing machine 14 to be described. Spaced heat exchangers or coolers 42, 43 are positioned within the drawing chamber 12 above the bath, between the horizontally extending lips of the L-blocks 32, 34 and the ribbon 30 and extend substantially the width of the chamber 12. The heat exchangers or coolers 42, 43 are constructed of refractory metal conduit or pipe for the passage of a cooling fluid, such as water, therethrough, the connections for inlet and discharge of cooling fluid being positioned outside the confines of the chamber 12.

The conduit or pipe extends horizontally across the space above the molten glass bath a small distance above the surface thereof from one side of the ribbon to the other. Usually the conduits are connected so that cooling water is fed into a conduit at one side of the drawing chamber, flows across the drawing chamber in a direction at right angles to the other side of the chamber, then returns to the feeding side, then back to the other side, etc., where it is withdrawn from the conduit.

The rate of flow of cooling water generally is adjusted so that there is about a 20° F. to 50° F. differential between the temperature of the water fed to and water withdrawn from the coolers. These coolers are not only adjacent the surface of the molten pool but are disposed at a level at which attenuation of the glass takes place. The usual temperature of the feed water is about 120° F., the water withdrawn being about 140° F. The amount of heat removed by these coolers is substantial, usually being in excess of 5,000 B.t.u. per minute.

The drawing machine 14 includes a plurality of pairs of driven and driving rolls 46 supported in spaced relationship by supporting structure generally indicated by 48. The pairs of rolls grip the ribbon 30 and exert a pulling force thereon, so as to draw the ribbon 30 from the bath 28 to a cutoff location, not shown, where the ribbon 30 is cut into discrete sheets of glass.

An electrically energized heating element 60 is positioned at the lip of the heat exchanger 42 facing the lip of the L-block 32, preferably so that it does not protrude below the heat exchanger. The heating elements 60, preferably in the form of a series of individual electrical resistance coils, extend the full length of the heat exchanger 42 across the drawing chamber and are disposed close to the surface of the pool. The exact location of such coils is capable of some variation.

An air flow control burner 320 may also be present.

Additional coolers or heat transfer means are in the form of a plurality of generally U-shaped bayonet cooling tubes 200 extending horizontally from the bottom of the L-block 32 toward the cooler 42. The mode of operation of one or more of the heat transfer means discussed heretofore is fully taught in said Ward et al. Patent No. 3,223,502, which of course are useful when operatively connected to conventional automatic control means (not shown in FIG. 6, but shown and described elsewhere) operated by the pyrometer of the invention. As pointed out in the Ward et al. patent, the differences between temperatures of various parts of molten glass and the ribbon are important to control of the uniformity in thickness of the ribbon. The linear rate at which the ribbon is drawn is also amenable to control by the pyrometer of the invention.

The various heat transfer means of FIG. 6 are not ordinarily all used at one time, although usually more than one such means are used.

It is to be understood that the drawings are not to scale; for example, the tubular heat exchangers 42, 42 supported on each side of the ribbon of glass, may extend opposite a greater vertical area of the glass ribbon, and may be of different shapes than are shown.

For use with the present invention, a viewing port 76′, suitably covered with heat resistant glass, is provided.

Referring to the right hand portion of FIG. 6, conventional elements and materials shown are the particulate glass batch 1 being fed to the melting zone 2, the fining zone 3, floaters 4, and heating ports 5 which discharge hot gases into the glass furnace for melting the batch. Convection currents in this portion of the tank lead to different temperatures at different locations, and electrodes 6 are at times useful to pass an electrical current through the molten glass, to control the temperature thereof, and to control said convection currents. Also useful at times are mechanical agitators or gas fed agitators (not shown).

Pyrometer 50c is connected with the tank cover at viewing port 76″, with the photocells 78 being operatively connected to control electrodes 6 and/or to the burners (not shown) through conventional automatic controls, for maintaining the proper differences in temperature of the molten glass, the rate of melting of the batch, and the like.

FIG. 7 is a view similar to FIG. 5, but with the photocells 78 arranged in the image area of pyrometer 50c for use with the glass furnace of FIG. 6, the melting zone 2′ and fining zone 3′ being shown as they would appear in the image area 77.

FIG. 8 shows pyrometer 50b of FIG. 6 in a somewhat different location with respect to the glass ribbon and molten glass from which it is withdrawn.

Figure 9:
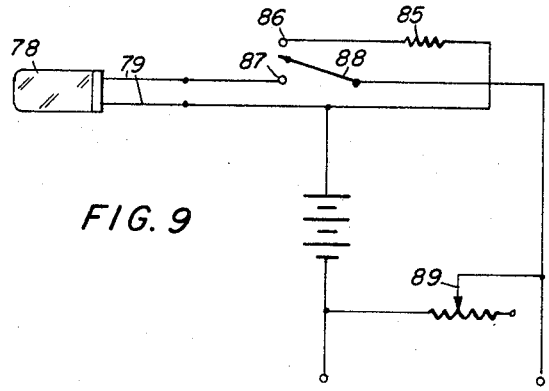
FIG. 9 is circuit for calibrating a variable resistance so that the temperature is accurately shown, or represented by current variation by the light cell.

Referring now to FIG. 9, there is illustrated a calibrating circuit for the photocell and its associated recording, indicating, and/or control equipment. A photocell 78 is connected by way of a line 79 between the positive terminal of a suitable power supply, such as a six-volt battery source, and an operation contact 87 of a calibration switch 88. With the operation contact 87 closed, the series arrangement of the battery source and the photocell is connected across a variable shunt resistor 89 to a suitable recorder such as a conventional recording millivoltmeter, and/or to a control device, for controlling the heat transfer to or from a hot body. As the temperature of the heat source being measured increases, the light impinging on the photocell increases in intensity. This results in a decreased resistance in the cell, an increased current flow from the battery, and an increased voltage drop across a resistor 89. This change in voltage drop is proportional to the light intensity at the cell and is measurable by the millivoltmeter.

As the battery source weakens with age, or the resistance of the circuit changes with changes in ambient temperature, the current flow through the photocell at a given light intensity will vary from its original value, and the recording equipment will not accurately reflect the temperature being measured. The system may be reset by moving the calibrating switch 88 from the operation contact 86, thus removing photocell 78 from the circuit and replacing it with a calibrating resistor 85 having a fixed resistance. Since this resistor 85 has a fixed value, it therefore should always produce the same reading on the recording equipment. If there has been a change in the calibrating current flow through the circuit, the voltage drop across a variable resistor 89 will vary from the normal value. By varying the resistance of the variable resistor 89, this voltage drop can be restored to its nominal value, thus recalibrating the system so that the photocell can again be placed in the circuit.

Figure 10:
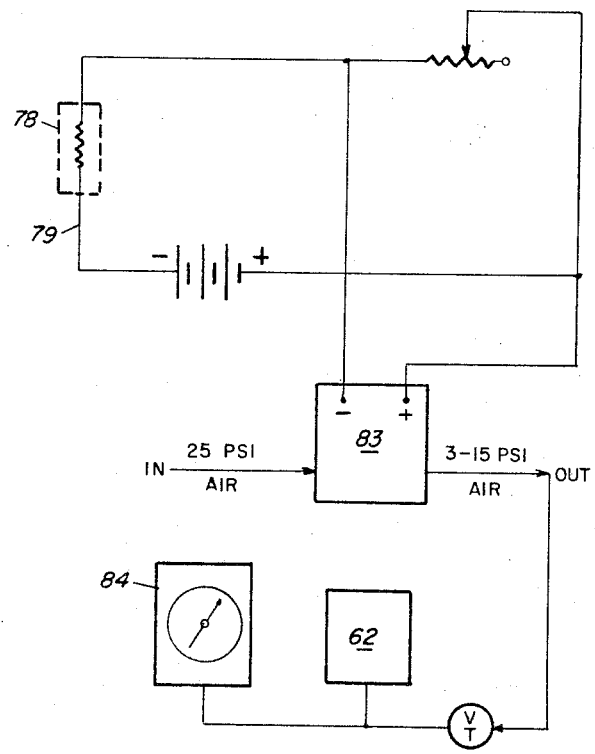
FIG. 10 represents the circuit and apparatus used in measuring and controlling the temperatures of a hot body.

If a remote indication of temperature is required, a pneumatic recorder of the type illustrated in FIG. 10 can be utilized. Here, the recording millivoltmeter is replaced by a voltage-sensitive valve means 83 which converts the applied voltage to a corresponding fluid pressure. An input source supplies fluid at, for example, 25 p.s.i., and the voltage-sensitive valve reduces this to an output of, for example, 3–15 p.s.i. This fluid may then be conducted to the remote location where it may operate a suitable pressure-sensitive indicator and recorder 84, and/or a controller 62, as in FIG. 3. The recorder is then calibrated to convert the fluid pressure to a corresponding temperature value.

It will be noted that the circuit of FIG. 10 does not show the calibrating resistor 85; however, it will be apparent that these elements could be connected in this circuit in the manner illustrated in FIG. 9.

Figure 11:
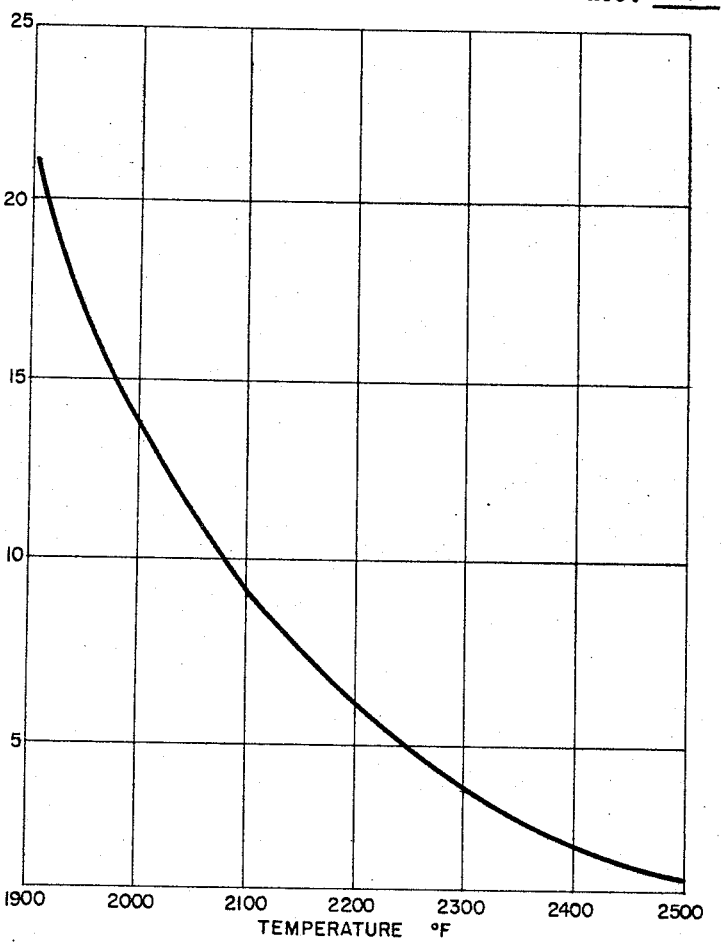
FIG. 11 is a curve which correlates temperatures of a hot body with the change in resistance of a typical photocell caused by light from the hot body at the given temperature.

FIG. 11 gives an example of a curve showing resistance of the cell in thousands of ohms as against the temperature of a hot body as measured by the pyrometer of the invention. To obtain the curve shown, a single photocell was mounted in the image area of the pyrometer of FIG. 1. The pyrometer was directed toward a Globar furnace, heated to about 2600° F., and the heat turned off. As the furnace cooled, the temperatures of the furnace were measured with a conventional high temperature thermocouple type of thermometer protected by a ceramic sleeve. (Such thermocouples are not wholly satisfactory in contact with molten glass because of difficulties in maintaining electrical circuits thereto and a tendency toward dissolution of the ceramic, nor are they satisfactory in areas subject to mechanical stress, such as in rotary kilns.) The temperatures were then plotted against resistance of the cell.

Figure 12:
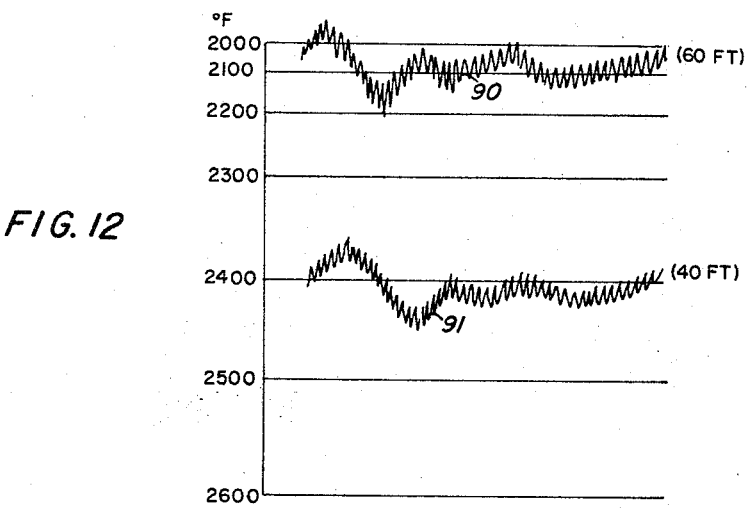
FIG. 12 is a portion of a chart made by apparatus similar to that shown in FIG. 10, showing the temperature, at different distances from the pyrometer, of a bed of barite particles, admixed with a reducing agent, being converted to barium sulfide. In the present invention, the pyrometer simultaneously reports two or more such temperatures at different distances from the pyrometer.

FIG. 12 represents a chart made with the apparatus of FIG. 3, in connection with the manufacture of black ash (BaS) from barites (BaSO₄). Curve 90 shows the temperature of the bed 60 feet from the pyrometer, and curve 91 shows the temperature of the bed 40 feet from the pyrometer, at any given instant. The kiln used was about 140 ft. in length. The fluctuations are normal, because of the tumbling of the bed; they can be dampened by use of a reducing valve having a variable orifice in the air line of a transducer system as shown in FIG. 10. It has been found that, with the kiln used, useful conditions are such that the surface temperatures of the bed at 96 ft. from the outlet end should be at about 1400–1450° F.; at 40 ft. (44 feet from the pyrometer) they should be about 2400° F.±about 30° F.; and at 60 ft. about 2100° F. At the discharge end of the kiln, the bed or hot body is at about 1900° F. The burner unit comprises the gas feed, primary air fed with the gas, and secondary air fed around the flame. Some air also enters through the discharge chute. Control of the air/gas ratios and of the total air and gas are used to adjust the temperatures at various locations. For instance, when the rate of rotation and slope of the kiln is such that the hot bed is moving at a rate of two feet per minute, it is apparent that control of the temperature of the bed at a point nearer the inlet end of the kiln will eventually influence the temperature of the bed at a point closer to the discharge end of the kiln. The air/combustible gas ratio is one way of controlling the temperature. Air increase in this ratio will cause an increase in the temperature of the bed at more distant points from the burner. By keeping the ratio constant but increasing or decreasing the amounts of air and gas, it is possible to control the temperature of the bed at points closer to the burner. To avoid overcompensating, the changes in the flame are applied in increments, with a delay achieved either manually or automatically, before another incremental change is made. The heat is transferred to the bed from the wall of the kiln as well as from the hot gases and radiation from the flame. This permits external control, by use of a sectioned hood around the kiln, of the amount of air that passes over the outside of the kiln shell. Thus it is possible to block off the flow of air over one part of the length of the kiln, and to minimize radiation from that section, giving external control. It will be apparent that there are other means of controlling the temperatures of different parts of the surfaces of hot bodies such as the bed in the kiln.

While reference heretofore has referred to the use of photocells, it will be apparent that other temperature measuring cells, such as those sensitive to infrared radiation, are also useful in the optical pyrometer of the invention.

I claim:

1. In a pyrometer for sensing the temperature of a hot body having varying surface temperatures, the improvement of a camera having lens for focusing an image of said body upon an image-receiving area at the back of said camera, said camera being arranged to simultaneously project an image of the parts of said body located at varying distances from said camera, a plurality of photocell devices, which pass an electrical current proportional to the light intensity, distributed at various points in said image-receiving area, each of said devices having energy output means in the form of pairs of lead wires, each of said pairs of lead wires being operatively connected to means for translating said energy output to another form of energy, whereby the temperature of various parts of said body may be measured simultaneously.

2. In a pyrometer for sensing the temperature of a hot body having varying surface temperatures, the improvement of a camera having lens for focusing an image of said body upon an image-receiving area at the back of said camera, said camera being arranged to simultaneously project an image of the parts of said body located at varying distances from said camera, a plurality of light intensity measuring devices distributed at various points in said image-receiving area, said measuring devices having energy output means, said measuring devices being adapted to vary the energy output with varying light intensity, said measuring devices being operatively connected to means for translating said energy output to another form of energy, including a temperature recording device, whereby the temperature of various parts of said body may be measured simultaneously.

3. The apparatus of claim 2 in which said pyrometer is combined with means for the thermal treatment of said hot body, and in which said energy output means is operatively connected to means associated with a device for controlling a process variable which determines the details of said thermal treatment.

4. The apparatus of claim 3 having means for controlling heat transfer between the hot body and its environment operatively connected to said energy output means.

5. The apparatus of claim 4 in combination with a kiln, and in which the heating means for said kiln is connected to and adapted to be controlled by energy from said energy output means.

6. The apparatus of claim 4 in combination with a glass melting and shaping apparatus, and in which means for controlling the temperature of said glass is connected to and adapted to be controlled by energy from said energy output means.

7. In a method of measuring temperatures by means of a pyrometer, the improvement of focusing an image of a hot body having differing temperatures at different locations on said body upon an image-receiving area, said different locations being at varying distances from said image-receiving area, simultaneously measuring the light intensities at said different locations on said body, and converting each of said intensities to a temperature value, whereby the temperatures of said different locations on said hot body are measured simultaneously.

8. In a method of measuring temperatures by means of a pyrometer, the improvement of focusing an image of a hot body having differing temperatures at different locations on said body upon an image-receiving area, said different locations being at varying distances from said image-receiving area, and simultaneously measuring the light intensity at different locations on said body, in which the means for measuring said light intensity involves a change in an electrical energy characteristic with a change in temperature and consequent light intensity, and said change in an electrical energy characteristic is utilized to control a thermal treatment of said hot body, whereby the temperatures of said different locations on said hot body are measured simultaneously, and the temperatures thereof are controlled.

9. The method of claim 8 in which said hot body is a mass of material undergoing calcining in a rotary kiln, and the control of said thermal treatment is control of the amount of heat applied to said body.

10. The method of claim 9 in which said hot body is molten glass in a glass melting and shaping apparatus.

References Cited

UNITED STATES PATENTS

| | | | |
|---|---|---|---|
| 2,234,328 | 3/1941 | Wolff | 73—355 X |
| 2,413,120 | 12/1946 | Swanson. | |
| 2,912,862 | 11/1959 | Machler et al. | 73—355 |
| 3,091,443 | 5/1963 | Herz et al. | 236—15 X |
| 3,201,584 | 8/1965 | Mullenger | 73—355 X |

ROBERT A. O'LEARY, *Primary Examiner.*

WILLIAM E. WAYNER, *Assistant Examiner.*

U.S. Cl. X.R.

236—69; 73—355; 65—162; 263—33; 356—43